March 6, 1962     J. V. OLIVEAU     3,024,052
LOCKING DEVICE
Filed Feb. 9, 1960     2 Sheets-Sheet 1
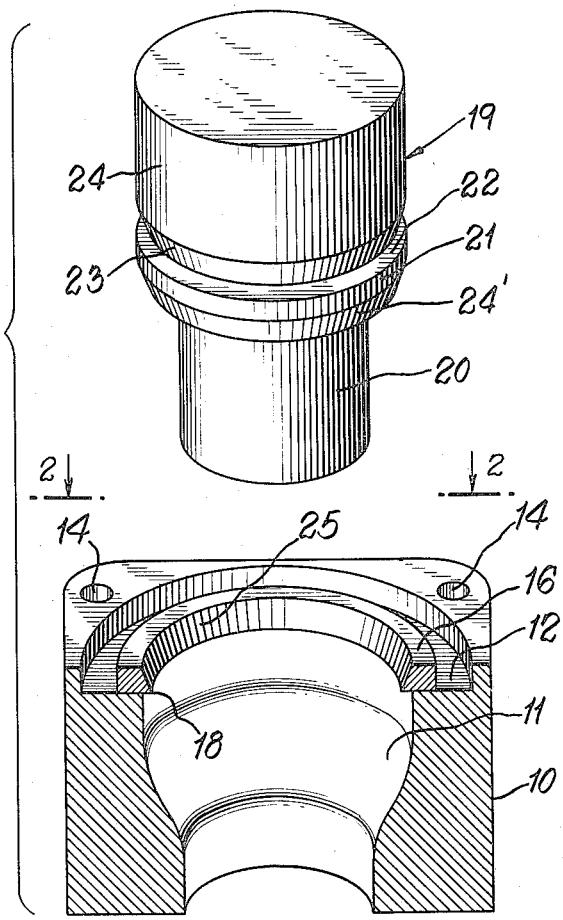
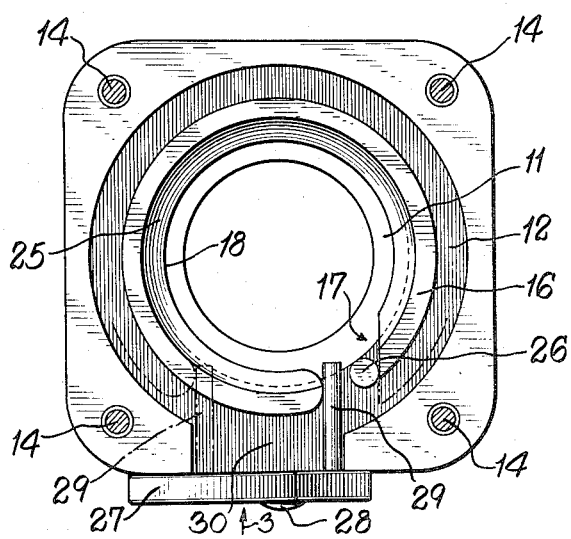
INVENTOR.
JOHN V. OLIVEAU
BY
Benj. T. Rauber
ATTORNEY

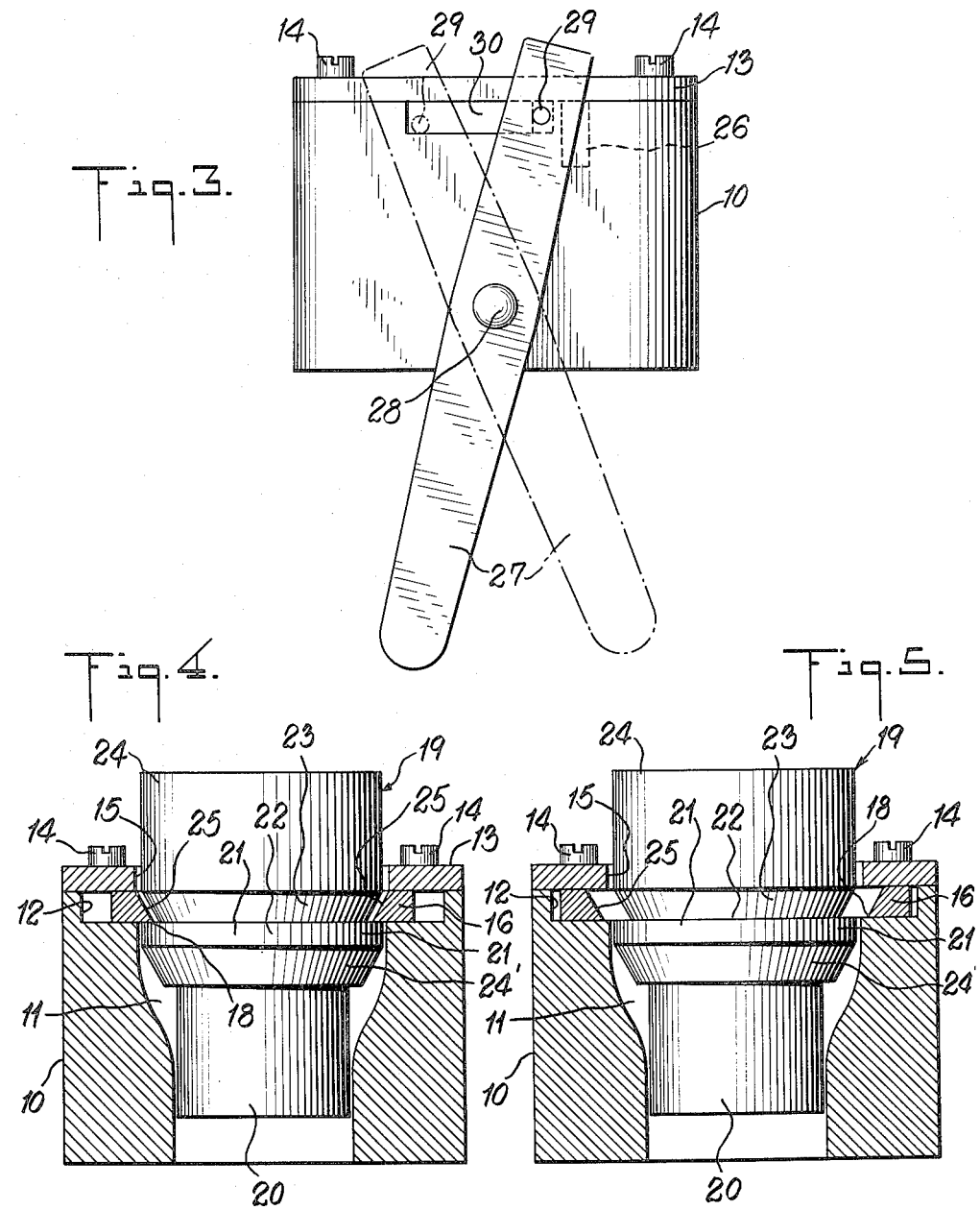

United States Patent Office 3,024,052
Patented Mar. 6, 1962

3,024,052
LOCKING DEVICE
John V. Oliveau, Greenwich, Conn., assignor to Aerotec Industries, Greenwich, Conn., a corporation of Connecticut
Filed Feb. 9, 1960, Ser. No. 7,636
6 Claims. (Cl. 287—119)

My present invention relates to a locking device and, more particularly, to a locking device particularly advantageous for disconnect for aircraft equipment.

The locking device of my invention is one having a minimum of elements combined in a manner of the greatest simplicity. This is attained by combining several functional requirements in elements of simple form. The combination of these elements is such that stresses occurring in use are received on elements so arranged as to present to such stresses the maximum resistance to yielding or breakage. The combination is, moreover, such as to enable the use of rugged elements and not to require any delicate or easily breakable parts. Maintenance costs are thus reduced to a minimum and, moreover, the device is capable of being readily dis-assembled for inspection and replacement of worn or broken parts.

The locking device of my invention comprises two members to be locked together, one member having a bore or recess and the other a stem which, in locked position, extends into the bore. The stem is provided with a shoulder which, in locked position, is accommodated in the entrance end of the bore and which has a surface normal to the axis of the bore. Mounted on the bored member at the entrance to the bore is a spring latch of interrupted annular form which in its unstressed condition projects past the edge of the bore to overlap the shoulder. The spring latch is held on the member by a cover plate which forms with the member an annular recess about the end of the bore in which the spring latch is retained.

To lock the members together, the stem of the one member is inserted into the bore of the other and moved therein until the shoulder passes the spring latch. The shoulder or the spring latch or both have surfaces inclined so that, in passing, the shoulder expands the spring latch and after having passed it, releases it to overlap the shoulder and prevent it from being withdrawn. To unlock the device a manually operable lever or key is mounted on the bored member to spread one end of the spring latch from the other end and thus expand the spring latch sufficiently to permit the shoulder to pass the latch and the stem to be withdrawn.

The various features are illustrated by way of example in the accompanying drawings, in which:

FIG. 1 is a perspective view of the members in unlocked, separated, positions the bored member and spring latch being shown in section, FIG. 2 is a plan view of the bored member and spring latch taken on line 2—2 of FIG. 1, FIG. 3 is an elevation of the bored member and spring latch taken from the line 3—3 of FIG. 2, FIG. 4 is a sectional elevation showing the members in locked position, and FIG. 5 is a section similar to that of FIG. 4 showing the spring latch expanded to permit withdrawal of the stem member.

In the embodiment of the invention illustrated in the drawings, a lower, bored, member 10 is provided with a central, vertical bore which expands or widens upwardly as at 11 and at its upper end is counter bored to form a circular recess 12. A cover plate 13 is secured to the upper surface of the member by means of screws 14. The cover plate has an opening 15 of a diameter approximating that of the expanded upper part 11 of the bore.

A circular spring 16 of annular shape and interrupted at a gap 17 is mounted in the recess 12 and retained against axial displacement therefrom by the cover plate 13. In its unstressed condition the spring 16 occupies the position shown in FIGS. 1 and 4 with its lower edge 18 projecting inwardly beyond the edge of the recess 12. The recess 12 is, however of sufficient radial depth to permit the spring to be expanded to the position shown in FIG. 5 with its inner edge 18 radially outward of the perimeter of the upper part of the bore.

An upper or stem member 19 is provided with a downwardly extending stem 20 of a diameter to be inserted into the bore of the member 10. Above the stem 20 the member widens to form a shoulder 21 of a diameter sufficient to pass through the opening 15 of the cover plate into the enlarged or expanded portion 11 of the bore but larger than the diameter of the edge 18 of the spring 16 when the spring is not expanded but is of the diameter shown in FIG. 4. The upper surface 22 of the shoulder 21 is flat and when the upper member is inserted and locked as shown in FIG. 4 may be in the same plane as the lower surface of the recess 12. Above the shoulder the upper member widens as shown at the inverted conical surface 23 to a cylindrical head 24. The lower part of the shoulder 21 is of an inverted frusto conical shape as shown at 24' and the inner periphery of the spring 16 is of similar frusto conical shape as at 25 so that when the upper member 19 is moved to insert the stem 20 and shoulder 21 into the bore of the lower member, the inclined or conical surface 24' will have a wedging action on the conical surface of the spring to expand the spring sufficiently to permit the shoulder to pass through it. After the shoulder has passed beneath the spring the spring snaps inwardly to overlap the shoulder thus preventing the upper member 19 from being withdrawn. The two members are then locked securely together.

To unlock the device and permit the upper member to be withdrawn the spring 16 must be expanded sufficiently so that its inner edge has a larger diameter than the outer edge of the shoulder. This is done by spreading the gap 17. For this purpose a stop 26, specifically a peg, to hold one end of the spring and the other end is then moved away by means of a lever 27 pivoted at 28 to the side of the member 10. The upper end of the lever is provided with a pin 29 which projects through a slot 30 through the wall of the member to engage the end of the spring opposite the stop 26. When the lever is swung from the position shown in full lines in FIG. 3 to the position shown in broken lines the spring is expanded sufficiently to permit the member 19 to be withdrawn. The lever 27 thus acts as a key to unlock the device. The circumferential surface of the recess 12 serves to prevent expansion of the spring beyond that required to release the member 19.

In the above device the spring serves the double function of locking the device and also of a return spring for the locking of the members. The locking is very secure as the upper or stem member can not be withdrawn when the spring is in locking position without shearing the spring throughout its length or shearing off the shoulder of the upper member. No delicate parts are required. All of the parts may be made sturdy and the number of parts is reduced to a minimum. An additional advantage is that the locking mechanism operation can be checked accurately during the assembly by operating the lever and expanding the spring before the retaining plate is installed.

Having described my invention, I claim:

1. A locking device which comprises a receiving member having a bore therein, said member having an annular recess about and opening into said bore and a slot extending from the outside of said member into said annular recess, a stop in said member within said annular recess adjacent said slot, an interrupted, circular spring in said annular recess encircling said bore, said spring being of a diameter to project inwardly of said recess into said bore and said recess being of a depth radially of said bore to permit expansion into said recess to clear said bore, one end of said ring abutting said stop, an actuating element extending from the outside of said member through said slot into abutment with the other end of said spring and movable in said slot to expand said ring into said recess clear of said bore between said stop and said element and a second locking member having a stem insertable into said bore and having an annular shoulder positioned to be engaged by said spring when inserted into said bore and to be disengaged when said ring is expanded by said element to clear said bore.

2. The locking device of claim 1 in which the inner periphery of said spring is tapered inwardly toward said bore.

3. The locking device of claim 1 in which the stem of said second member slopes radially outwardly to the edge of said shoulder and said bore expands outwardly toward said recess to receive said shoulder when said members are locked together.

4. The locking device of claim 1 in which said actuating element comprises a lever pivoted on the outside of said receiving member and has a pin extending through said slot into engagement with the interrupted end of the spring opposite said stop.

5. A locking device which comprises a receiving member having a bore, a retaining plate mounted on said member and having an opening aligned with said bore, the opposed faces of said plate and member being spaced apart about the end of said bore to form an annular spring retaining recess, an interrupted annular spring in said recess, said spring projecting inwardly to overlap the edge of said bore and being expansible within said recess to clear the edge of the bore, a stop abutting one end of said spring, said member having a slot extending from the outside of said member into said recess, a manually operable lever outside of and pivoted on said member and extending through said slot to engage the other end of said spring and tiltable to expand said spring to clear said bore and a second member having a shoulder insertable into said bore past said spring, the engaging surfaces of said spring and said shoulder being inclined to wedge said spring outwardly as said second member is inserted into said bore to expand said spring during the passage of said shoulder through said spring and to release said spring after the passage of the shoulder therethrough.

6. A locking device which comprises a receiving member having a bore and having a circumferential recess in said bore near the receiving end of the member, an interrupted annular spring in said recess, said spring extending inwardly to overlap the inner edge of said recess and being expansible within said recess to clear the edge of the bore, a second member having a stem and a shoulder insertable into said bore past said annular spring, the contacting outer edge of said shoulder and inner edge of said spring being inclined to provide an outwardly wedging action on said spring to expand said spring as said shoulder passes within said spring and to release said spring upon said shoulder passing said recess, a stop abutting one end of said spring, and manual means extending from outside said member into abutment with the other end of said spring and operable to permit withdrawal of said second member.

References Cited in the file of this patent

UNITED STATES PATENTS

| | | |
|---|---|---|
| 1,176,205 | Cutlip | Mar. 21, 1916 |
| 1,771,949 | Blanchard | July 29, 1930 |
| 2,509,081 | Bluth et al. | May 23, 1950 |
| 2,533,763 | Cacciotti | Dec. 12, 1950 |
| 2,598,758 | Byram | June 3, 1952 |

FOREIGN PATENTS

| | | |
|---|---|---|
| 350,027 | Germany | Mar. 11, 1922 |